United States Patent [19]

O'Neil et al.

[11] 4,241,094
[45] Dec. 23, 1980

[54] POTATO DEHYDRATION

[75] Inventors: James D. O'Neil, Minneapolis; Gregory M. Granum, Bloomington; Elmars M. Kiploks; Charles N. Standing, both of Minneapolis, all of Minn.

[73] Assignee: The Pillsbury Company, Minneapolis, Minn.

[21] Appl. No.: 83,885

[22] Filed: Oct. 11, 1979

[51] Int. Cl.³ .............................................. A23L 1/216
[52] U.S. Cl. .................................. 426/324; 426/404; 426/410; 426/457; 426/464; 426/473; 426/637
[58] Field of Search ............... 426/324, 321, 637, 392, 426/410, 419, 457, 464, 473, 509, 510, 524, 397, 404

[56] References Cited

U.S. PATENT DOCUMENTS

| | | | |
|---|---|---|---|
| 3,012,897 | 12/1961 | Sullivan et al. | 426/457 X |
| 3,024,823 | 3/1962 | Hyde et al. | 241/93 |
| 3,057,387 | 10/1962 | Hyde et al. | 241/3 |
| 3,067,042 | 12/1962 | Pader | 426/457 |
| 3,410,702 | 11/1968 | Frank | 426/637 |
| 3,535,128 | 10/1970 | Willard | 426/456 |
| 3,574,643 | 4/1971 | Lewis | 426/637 X |
| 3,594,187 | 7/1971 | Liepa | 426/637 |
| 3,764,716 | 10/1973 | Rainwater et al. | 426/510 X |
| 3,862,345 | 1/1975 | Westover et al. | 426/637 X |
| 3,959,501 | 5/1976 | Shatila | 426/637 X |
| 4,156,744 | 5/1979 | Kiploks et al. | 426/637 |

FOREIGN PATENT DOCUMENTS 1187762  4/1970  United Kingdom .................... 426/637

Primary Examiner—Arthur L. Corbin
Attorney, Agent, or Firm—Robert J. Lewis; Michael D. Ellwein; Mart C. Matthews

[57] ABSTRACT

A process is provided for the production of dehydrated potatoes which when reconstituted are similar in texture and taste to freshly prepared mashed potatoes. The process includes washing fresh potatoes, dividing the washed potatoes into two groups with one group being cooked, riced, peeled and cooled while the other group is peeled, sliced, blanched, cooled, cooked, riced and then cooled. The two groups of potatoes, after the initial processing steps as separate groups, are then combined and further processed to produce dehydrated potato flakes. The thus produced dehydrated potatoes can be packaged for distribution to the ultimate consumer.

17 Claims, 2 Drawing Figures

POTATO DEHYDRATION

FIELD OF THE INVENTION

The present invention relates to a process for processing potatoes in a manner to produce dehydrated potato flakes which when reconstituted are similar in quality, taste and texture to freshly prepared mashed potatoes.

BACKGROUND OF THE INVENTION

The art of potato processing to produce dehydrated potato flakes is replete with processes for producing dehydrated potato flakes. The ultimate goal of such processes, of course, is to have a product which has qualities as close as possible to those of prepared, fresh potatoes in order to achieve as high as possible consumer acceptance for the product. Typical of such processes are those disclosed in U.S. Pat. Nos. 2,787,553; 2,959,487; 3,009,817; and 3,764,716. The disclosures in all cited patents, books, etc., are incorporated herein by reference. A typical prior art process involves first washing the potatoes and optionally peeling them after the washing step. After this, the potatoes are sliced, blanched, cooled and steam cooked. After the cooking, the potatoes are riced and if not peeled before this step, can be peeled during the ricing step as, for example, by an apparatus disclosed in U.S. Pat. No. 3,862,345. After ricing, the processed potatoes have additives for prevention of various modes of failure added thereto and are subsequently flaked and cooled. After cooling, flavoring can be added to the flaked potatoes prior to packaging the thus prepared dehydrated potato flakes for storage, shipment and distribution to the ultimate consumer.

The problem with such processes, as have been practiced in the past, is that of simultaneously achieving both taste and texture qualities of freshly prepared mashed potatoes. The immediately above-described process will provide a potato flake product which has acceptable but less than optimal texture and taste qualities. Some processes are known which will provide an acceptable product as far as taste is concerned, but the product is unacceptable as far as texture is concerned in that the reconstituted product is pasty which is objectionable to consumers.

In the prior art, in order to achieve a product which is acceptable in taste, processes are sometimes used which result in a product which when reconstituted has a pasty texture and, therefore, unacceptable to the ultimate consumer. The pastiness is due to the disruption of individual potato flesh cells which allows gelatinized starch to be present in a free form throughout the potato mass. This is often the result of using certain cooking approaches (such as straight steam cooking) which are practiced to produce the acceptable taste.

In preparing a product which when reconstituted would provide an acceptable texture, the taste was objectionable because during processing the steps of water blanching and cooling are required for achieving the correct texture. These steps result in leaching and various aqueous phase reactions which degrade the taste quality of the reconstituted product.

In the prior art, one method of achieving better taste qualities in a product having acceptable texture properties was by the addition of taste additives to the product. However, in view of current consumer sentiment, the addition of additives is objectionable if it can be avoided. Thus, it would be highly desirable to provide a product which would not require the addition of flavorings in order to have an acceptable taste and texture product.

It is well known in the art that dehydrated potatoes will degrade, as far as taste and texture qualities are concerned, with age. Degrading is accelerated by an increase in the storage temperature, an increase in the product moisture content and an increase in the oxygen in the environment surrounding the product. The prior art dehydrated potatoes normally had a taste and texture quality which was marginally acceptable immediately after the product was produced but after storage the dehydrated potatoes would degrade with a consequent lowering of the taste and texture qualities. Thus, with the unpredictability of storage conditions and storage life, a consumer could buy one box of product which would be marginally acceptable and the next box would be totally unacceptable. Even worse, the first box of the product may be totally unacceptable and no more product of the particular brand would be purchased because of the initial impression. Accordingly, it would be highly desirable to provide a product which would start at an initially higher value for taste and texture qualities whereby during degradation during storage the product would still be more acceptable to the consumer upon ultimate consumption. Typically, shelf life of such products can extend to, on the average, up to 18 months.

It is well known to those skilled in the art that dehydrated potato products will generally degrade, under the same storage conditions, at the same rate irrespective of the manner in which the product was processed. Thus, a process is required which will place the prepared dehydrated potato products at an initially higher value for taste and texture and other qualities than currently existing products in order to provide the increased shelf life and a product which is more acceptable to the ultimate consumer.

Figure 1:
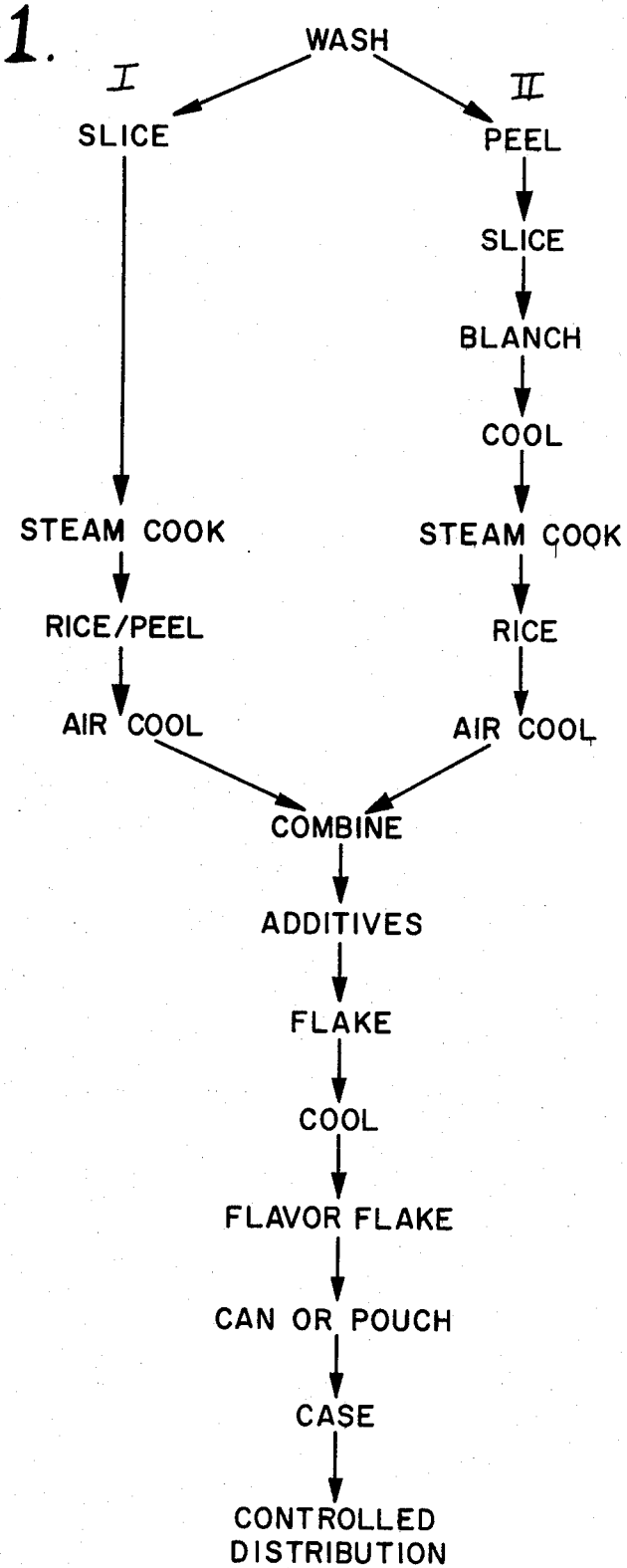
FIG. 1 is a flow chart depicting steps of a process of the instant invention.

FIG. 1 illustrates the present invention in flow chart form. The process is preferably continuous but can also be a batch process. As can be seen, the process is initially a two-branch process with the two branches being two different potato cooking processes. After cooking, the resulting cooked potatoes from the two cooking processes are combined and further processed to produce dehydrated potato flakes.

Initially, the potatoes are washed to remove dirt and other foreign substances as is known to those skilled in the art. Any suitable washing process can be utilized as, for example, those disclosed in Talburt, W. F. and O. Smith, 1975, "Potato Processing", 3rd edition, AVI Publishing, Westport, Conn. After washing, the potatoes are divided into two groups—one group for utilization in cooking process I and the other group for utilization in cooking process II. It is preferred that the ratio of potatoes for the two different cooking processes be between about 25% and 75% by weight for utilization in cooking process I and between about 25% and about 75% by weight for cooking process II. More preferably, it is preferred that the potatoes for cooking process I be between about 45% and about 60% by weight and those for cooking process II be between about 40% and about 55% by weight. More preferably the potatoes are divided such that about 50% to 55% by weight are utilized in cooking process I and between about 45% and about 50% are utilized in cooking process II.

The ratio of the potatoes for cooking process I and cooking process II will be dependent upon numerous factors such as: (i) the condition of the tubers as dictated by age and storage conditions, (ii) the inherent cell wall and starch characteristics of the tubers as dictated by cultivar and crop year, (iii) the inherent character of the processing equipment as it pertains to its propensity for macerating or comminuting individual potato cells, and (iv) the degree of close control which is exercised in the overall process.

With specific reference to cooking process I, the potatoes are first sliced with the thickness of the slices being between about $\frac{1}{4}$ and $\frac{3}{4}$ inch and preferably between about $\frac{1}{2}$ and about $\frac{5}{8}$ inch in thickness. Optionally, the potatoes can be peeled before slicing with the peeling being accomplished prior to slicing in any suitable manner such as those described in Talburt, W. F. and O. Smith, 1975, "Potato Processing", 3rd edition, AVI Publishing, Westport, Conn. After slicing, the thus sliced potatoes are suitably cooked such as by steam cooking as is known in the art, see for example, Cording, J. L., et al., 1955, U.S. Dept. of Agr., Agr. Res. Circ. 73–9. The cooking is accomplished at about 212° F. for about 7 to 30 minutes with the cooking being sufficient to gelatinize virtually all starch granules and decrease intercellular adhesion. After cooking, the potatoes are riced in any suitable manner such as that disclosed in U.S. Pat. No. 3,862,345. In the last-mentioned patent, the potatoes are riced and peeled at the same time, which is a preferred embodiment—thus, eliminating the need for peeling the potatoes prior to slicing. Ricing is carried out at the following conditions: drum nip width about 0.010", drum perforations about 9/64" in diameter, drum void space about the two drums having rpm's which are different by about 2–5%.

After ricing and peeling, the thus processed potatoes are cooled in any suitable manner such as by exposing to dry, cool, ambient air. It is desired that the cooling of the processed potatoes be as fast as practical in order to prevent skinning, microbial deterioration, chemical deterioration, and overcooking. The potatoes are cooled to below about 115° F., more preferably below about 100° F., and most preferably below about 85° F. This step provides the important new functions of: (i) a sharp cessation of cooking between the cook step and subsequent steps so as to prevent overcooking, (ii) slight starch retrogradation so as to decrease pastiness, (iii) potato cell wall firming to enhance natural graininess, and (iv) an enhanced ease of moisture release during subsequent drying to decrease scorching in the drying process.

Cooking process I provides the subsequent reconstituted potato flakes with the desired taste qualities.

Cooking process II utilizes its portion of washed potatoes by first peeling the potatoes in any suitable manner such as by abrasion peeling, lye peeling, or steam peeling as is known in the art. Peeling is desired to improve flavor and decrease flavor deterioration by removing prooxidant compounds and browning precursors. After peeling, the potatoes are sliced by any suitable means with the thickness of the slices preferably being between about $\frac{1}{4}$" and about $\frac{3}{4}$" and preferably between about $\frac{1}{2}$" and about $\frac{5}{8}$". After slicing, the potatoes are blanched in a manner known to those skilled in the art as, for example, that disclosed in Cording, J. L., et al., 1955, U.S. Dept. of Agr., Agr. Res. Circ., 73–9. The blanching is usually carried out in a dilute aqueous solution containing anti-discolorant chemicals such as sodium bisulfite and sodium acid pyrophosphate at a temperature of about 160°±10° F. for a period of about 20±5 minutes. Blanching provides qualities of full-bodied texture and decreased pastiness to the final product when combined with the following cooling and cooking steps.

After the blanching step, the blanched potatoes are cooled so that the flesh films and becomes tolerant to the subsequent final cooking step. Cooling can be by any suitable method such as by submersion in cold, potable water of about 40°–70° F., with the temperature of the blanched potatoes being lowered to below about 80° F., more preferably below about 70° F., and most preferably to about 60° F. or less. It is preferred that the potatoes be cooled as quickly as possible.

After the blanched potatoes are cooled, they are subjected to cooking, such as steam cooking, usually at conditions of atmospheric steam, or about 14.7 psi and 212° F. A typical steam-cooking process is disclosed in U.S. Pat. No. 2,759,832.

The combination of the steps of blanch, cool, and steam-cook provide decreased pastiness and increased graininess for the potatoes which gives some of the desirable texture properties to the reconstituted dehydrated potato flakes.

After the steam cooking, the thus cooked potatoes are riced in any suitable manner such as that disclosed for the ricing step in cooking process I. The riced potatoes are then cooled prior to flaking to increase resistance to heat damage during flaking. The cooling process can be that disclosed for cooking process I.

Before or after cooling, the potato products from cooking process I and cooking process II are combined as, for example, by mixing such that the mass of potatoes is homogeneous. The combining step can be conducted in any manner which will not significantly comminute individual potato cells, such as batchwise in a planetary mixer or continuously in a trough with cut-flight conveyors and stators.

In a preferred embodiment of the present invention after the pototoes have been combined from cooking process I and cooking process II, additives are added to the potatoes. Such additives can include shelf life extenders and processing aids. The shelf life extender can be added to the potatoes from cooking process I and/or cooking process II after the respective step of ricing. Such additives are for the prevention of non-enzymatic browning, oxidative rancidity, and pastiness, and as processing aids, and can include the following additives: sodium bisulfite, sodium acid pyrophosphate, butylated hydroxy anisole and/or BHT, citric acid, and emulsifiers such as mono- and diglycerides as is known in the art. *Potato Processing,* supra, lists typical additives. The additives added are thoroughly combined with the combined mass of potatoes.

After the additives are added, the combined mass of potatoes are then subjected to a flaking operation such as that disclosed in U.S. Pat. No. 3,535,128. During flaking, the combined mass of potatoes is dehydrated as, for example, at 300°±50° F. using an internal drum steam pressure of 110±20 psig. The combined mass of potatoes is dried to a moisture content preferably of less than about 9% and preferably less than about 6% by weight. Optionally, the flaking operation may use chilled applicator rolls as disclosed in U.S. Pat. No. 3,418,142 to decrease heat damage to the resulting product. Most preferably, the flaking is done under conditions to lower the mass of potatoes to about the so-called BET monolayer moisture level (about 5.5% moisture) in order to increase shelf life.

After the flaking operation, the thus dehydrated potatoes should be further cooled, preferably to a temperature of less than about 70° F. The cooling can be done by, for example, airveying the potato flakes with cool, dry air.

A flavor additive can be added to the potatoes from cooking process I and/or cooking process II after the respective step of cooking. Preferably, after the flaking and/or cooling, flavoring can be added to the thus produced flakes if desired. Typical flavorings include various methoxy pyrazines and butter notes and can be combined with the flakes in a manner known to those skilled in the art such as that disclosed in U.S. Pat. No. 3,833,739.

The flaked potatoes can then be packaged in any suitable container, cased and then sent to storage or distribution. In the packaging of the flaked potato product, it is preferred that the packaging have a moisture barrier, an oxygen barrier and that the packages be stored at a temperature preferably less than about 70° F., more preferably less than about 40° F. and most preferably less than about 0° F. It is most preferred that the package be such that it can maintain a reduced oxygen content of about 1% or less and that the equilibrium relative humidity in the package be less than about 40%.

In order to illustrate operability of the present invention, the following data are provided.

EXAMPLE I

Instant mashed potato flakes were produced according to the invention process outlined in FIG. 1.

The ratio of potatoes in cooking process I to cooking process II was 67/33. The method by which the potatoes were cooled after cooking and prior to drying referred to as "mash cooling", involved cooling the whole slabs on stainless steel screens in ambient air of about 80° F. and 40% relative humidity and a velocity of about 100 feet/minute until a final average potato temperature of 85° F. was reached and then holding the potatoes at about 85° F. for 40 minutes.

Two different production runs were executed with this method. Product from the first was tested in Consumer Test A and product from the second was tested in Consumer Test B which were both blind taste tests.

A summary of the results of these consumer tests is given in Table I in which the overall hedonic rating is given for five products: fresh mashed potatoes, the target product; conventionally processed potato flakes, both with and without conventional flavor additives; and potato flakes processed by the method of the present invention, both with and without conventional flavor additives. Conventional processed is the same as cooking process II and subsequent steps, but does not cool the riced potatoes (no mash cool) and, of course, has no combining step and the peeling and ricing are in one step as described in cooking process I.

In both consumer tests, the product of the present invention with flavor additives was rated equal to fresh mashed potatoes. With 60 tasters involved in test A and 120 tasters involved in test B, the invention ratings of 6.35 and 6.21 were statistically identical to the ratings of 6.43 and 6.46 for fresh. All other non-invention products had hedonic ratings which were lower than fresh to a statistically significant extent.

The superiority of the invention products relative to those of conventional products is also seen in comparing hedonic ratings in a parallel manner within Table I. In all cases of comparing invention to non-invention, while keeping constant the presence or absence of flavor additive, the invention product is superior to a significant extent with hedonic increases ranging from 0.7 to 1.4, with an average hedonic increment of 1.1.

Further details of the results of Consumer Test A and B are given in Tables II and III, respectively. These give ratings for individual flavor, aroma, and texture scales as well as overall hedonic. In each case, the ratings for invention product with additives were not statistically different from those of fresh except for certain butter flavor scales in which invention product was actually superior. Once again, invention products were consistently superior to non-invention products.

TABLE I

Hedonic Ratings for Example 1
(1, dislike intensely to 9, like intensely)

| Consumer Test A | | | | |
|---|---|---|---|---|
| Conventional | | | Invention | |
| with flavor | w/o flavor | Fresh | with flavor | w/o flavor |
| 4.96 | 5.40 | 6.43 | 6.35 | 6.10 |
| Consumer Test B | | | | |
| Conventional | | | Invention | |
| with flavor | w/o flavor | Fresh | with flavor | w/o flavor |
| 5.29 | 4.04 | 6.46 | 6.21 | 5.37 |

EXAMPLE II

Instant mashed potato flakes were produced according to the present invention process.

The ratio of potatoes used in cooking process I to cooking process II was 50/50. The method of cooling the potatoes between cooking and drying was the same as for Example I.

Product was tested against fresh mashed potatoes in Consumer Test C in which 120 respondents judged the products in blind taste tests. Results are given in Table IV for overall hedonic rating and percent of respondents perceiving the product as being fresh mashed potatoes.

TABLE IV

Results for Consumer Test C
from Example 2

| | Fresh Mashed Potatoes | Invention with Flavor Additive |
|---|---|---|
| Hedonic Rating | 6.04 | 6.25 |
| Percent Perceiving as Fresh | 51.6 | 46.8 |

Both products scored an average hedonic rating of slightly over 6 and had about one-half of the testers perceiving the product as being fresh. These figures were not statistically different from each other, and indicate again the efficacy of the present invention in producing product of high quality.

EXAMPLE III

Instant mashed potato flakes were produced using the present invention process.

The ratio of potatoes used in cooking process I to cooking process II was 75/25. The method of cooling the potatoes between cooking and drying was varied, with three different methods compared against a fourth product which had no "mash cooling".

These four products were tested against fresh mashed potatoes for texture properties using a laboratory expert panel of 10 people who tasted each product in a blind, sequential manner on two different occasions.

The results for mash viscosity and wetness are presented in Table V. The three different methods of "mash cooling" are also indicated in the table. The fresh control product had high viscosity and low wetness ratings, 44 and 15.5, respectively. The invention product with no "mash cooling" had lower average viscosity rating (29) and higher wetness rating (32.5) and was judged to be too wet. Products (2), (3) and (4), which employed the invention process and three different mash cooling techniques, all had higher viscosity (37 to 42.5) and lower wetness (17.5 to 24.5) and sufficiently close to the ratings of fresh product to be deemed completely satisfactory.

TABLE V

Texture Ratings for Product from Example III

| | | Viscosity (0, thin; 60, stiff) | Wetness (0, dry; 60, wet) |
|---|---|---|---|
| (1) | Fresh Control Product | 44.0 ± 4.0 | 15.5 ± 4.0 |
| (2) | Invention with "mash cooling" via cooling the rice in air to 80° F. & holding 50 min. | 42.5 ± 4.5 | 17.5 ± 4.0 |
| (3) | Invention with "mash cooling" via cooling the slices in water to 80° F. & holding 50 min. | 40.0 ± 4.0 | 18.5 ± 4.0 |
| (4) | Invention with "mash cooling" via cooling the slices in air to 80° F. & holding 40 min. | 37.0 ± 4.0 | 24.5 ± 4.0 |
| (5) | Invention with no "mash cooling" | 29.0 ± 4.0 | 32.5 ± 4.5 |

TABLE II

Details of Results for Consumer Test A from Example I

| | Conventional w/Add. | w/o Add. | Fresh Control | Invention w/Add. | w/o Add. |
|---|---|---|---|---|---|
| Texture Appearance 8 = Exc, 2 = Poor | 4.84 | 5.86 | 6.32 | 6.24 | 5.98 |
| Color 8 = Exc, 2 = Poor | 5.43 | 6.08 | 6.31 | 6.44 | 6.22 |
| Hedonic (9 point) | 4.96 | 5.40 | 6.43 | 6.35 | 6.10 |
| Aroma 8 = Exc, 2 = Poor | 5.10 | 4.91 | 5.66 | 5.68 | 5.38 |
| Flavor 8 = Exc, 2 = Poor | 5.28 | 5.22 | 6.00 | 6.02 | 5.85 |
| Flavor 7 = too strong 4 = JAR, 1 = too weak | 3.71 | 3.61 | 3.94 | 3.97 | 3.54 |
| Butter Flavor 8 = Exc, 2 = Poor | 5.29 | 5.14 | 5.04 | 5.76 | 5.61 |
| Butter Flavor 7 = too strong 4 = JAR, 1 = too weak | 3.49 | 3.26 | 2.68 | 3.82 | 3.49 |
| Eating Texture 8 = Exc, 2 = Poor | 4.73 | 5.25 | 6.08 | 5.91 | 5.64 |
| Graininess 6 = extr, 1 = none | 1.37 | 2.42 | 2.31 | 1.86 | 1.80 |
| Pastiness 6 = extr, 1 = none | 2.11 | 1.92 | 2.22 | 1.75 | 2.07 |
| Pleasantness of aftertaste 6 = Ext'ly, 1 = not at all | 2.64 | 2.76 | 3.50 | 3.38 | 3.41 |

TABLE III

Details of Results for Consumer Test B from Example I

| | TPC Current w/Add. | TPC Current w/o Add. | Fresh Control | FPQ w/Add. | FPQ w/o Add. |
|---|---|---|---|---|---|
| Texture Appearance 8 = Exc, 2 = Poor | 5.68 | 5.82 | 6.51 | 6.56 | 6.53 |
| Color 8 = Exc, 2 = Poor | 6.02 | 6.09 | 6.62 | 6.72 | 6.71 |
| Hedonic (9 Point) | 5.29 | 4.04 | 6.46 | 6.21 | 5.37 |
| Aroma 8 = Exc. 2 = Poor | 5.31 | 4.46 | 5.89 | 5.62 | 4.95 |
| Flavor 8 = Exc, 2 = Poor | 5.47 | 4.57 | 6.24 | 6.06 | 5.42 |
| Flavor 7 = too strong 4 = JAR, 1 = too weak | 3.69 | 3.35 | 4.07 | 4.00 | 3.51 |
| Butter Flavor 8 = Exc. 2 = Poor | 5.33 | 4.30 | 5.32 | 5.51 | 4.81 |
| Butter Flavor | 3.52 | 2.64 | 3.37 | 3.74 | 2.97 |

TABLE III-continued
Details of Results for Consumer Test B from Example I

|  | TPC Current w/Add. | TPC Current w/o Add. | Fresh Control | FPQ w/Add. | FPQ w/o Add. |
|---|---|---|---|---|---|
| 7 = too strong 4 = JAR, 1 = too weak Eating Texture | 5.33 | 4.54 | 6.02 | 5.94 | 5.52 |
| 8 = Exc, 2 = Poor Graininess | 1.73 | 3.02 | 1.94 | 2.07 | 2.29 |
| 6 = extr, 1 = none Pastiness | 2.35 | 2.33 | 1.83 | 1.76 | 2.13 |
| 6 = extr, 1 = none Pleasantness of aftertaste 6 = Ext'ly, 1 = not at all | 2.64 | 2.27 | 3.32 | 3.40 | 2.65 |

Figure 2:
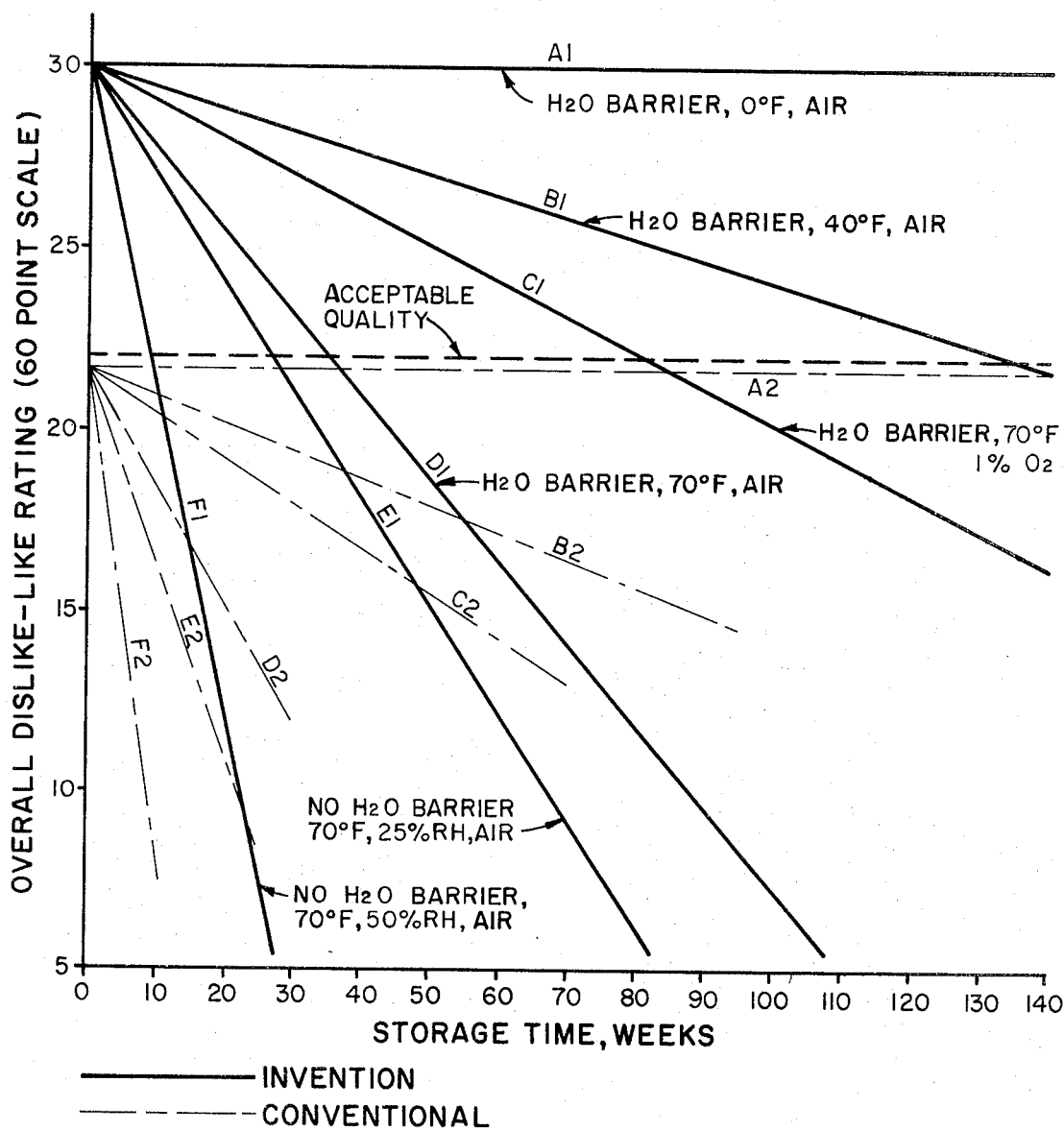
FIG. 2 is a graph depicting hedonic ratings for reconstituted potato products made in accordance with the present invention and hedonic values for reconstituted potato products made in accordance with a prior art method.

FIG. 2 illustrates graphically a comparison of reconstituted potatoes made in accordance with the present invention and that made in accordance with a conventional process as described above. As can be seen, the overall dislike/like rating for 0 week storage for the invention was about 9 points higher than that of conventionally prepared reconstituted potatoes. It is interesting to note that the highest rating of the conventional product was slightly less than the minimum acceptable quality which a consumer was willing to accept in freshly prepared potatoes. Thus, even with no storage life, the conventional product would not be acceptable in taste or texture to the average consumer. Each array of lines for the invention and conventional product illustrate different degradation rates for various types of packaging of the product. Thus, lines A1, B1, C1, D1, and E1 for the invention and the respective lines A2, B2, C2, D2 and E2 for the conventional product are parallel and represent the same type of container storage conditions. It is well known that rate of degradation is the same regardless of the method of preparation. Thus, three types of packaging would render the invention acceptable by the consumer given an 18-month target design storage time. This would be illustrated by lines A1, B1 and C1. None of the methods of storage for conventionally prepared product would result in acceptable product if the objective is virtual equality to fresh mashed potatoes. Even with less desirable types of packaging, the present invention provides a higher hedonic rating for the reconstituted product compared to conventional reconstituted product. If the distribution system could be altered to reduce storage time, then other types of packaging would also provide acceptable product to the consumer. Even if the storage could not be optimized, the invention would provide product superior to conventional product for a given length of storage time.

It is to be understood that while there has been illustrated and described certain forms of the present invention, the invention is not to be limited to the specific form or arrangement of process steps herein described and shown except to the extent that such limitations are found in the appended claims.

What is claimed is:

1. A method of producing dehydrated potatoes, said method including:
cleaning a quantity of potatoes;
separating the potatoes into a first group and a second group before or after cleaning with the weight ratio of the first group to the second group being in the range of between about 25:75 to 75:25;
slicing the first group of potatoes;
cooking the thus sliced first group of potatoes an amount sufficient to permit ricing;
ricing the thus cooked first group of potatoes;
peeling the first group of potatoes either before slicing or during ricing;
cooling the thus riced ptatoes to a temperature of less than about 115° F.;
peeling the thus washed second group of potatoes;
slicing the thus peeled second group of potatoes;
blanching the thus sliced second group of potatoes;
cooling the thus blanched second group of potatoes to a temperature of less than about 80° F.;
cooking the thus cooled second group of potatoes an amount sufficient to permit ricing;
ricing the thus cooled second group of potatoes;
cooling the thus riced second group of potatoes to a temperature of less than about 115° F.;
combining and mixing the thus riced and subsequently cooled first group and second group of potatoes; and
dehydrating the thus combined and mixed first group and second group of potatoes to a moisture content of less than about 9% by weight.

2. A method as set forth in claim 1 including:
adding a shelf life extending additive to at least one of the first group and second group of potatoes after the respective step of ricing.

3. A method as set forth in claim 2 including:
cooling the thus dehydrated first group and second group of potatoes to a temperature of less than about 70° F.

4. A method as set forth in claim 1 including:
cooling the thus dehydrated first group and second group of potatoes to a temperature of less than about 70° F.

5. A method as set forth in claim 1, 2, 4 or 3 including:
packaging the thus dehydrated first group and second group of potatoes in a package.

6. A method as set forth in claim 5 wherein:
the environment in the package contains less than about 1% free oxygen and contains less than about 40% equilibrium relative humidity.

7. A method as set forth in claim 6 including:
storing the thus packaged potatoes at a temperature of less than about 70° F.

8. A method as set forth in claim 5 including:
storing the thus packaged potatoes at a temperature of less than about 40° F.

9. A method as set forth in claim 8 wherein:
the storage temperature is less than about 0° F.

10. A method as set forth in claim 1, 2, 4 or 3 including:

adding a flavor additive to at least one of the first group and second group of potatoes after the respective step of cooking.

11. A method as set forth in claim 10 wherein:
the flavor additive is added after dehydrating.

12. A method as set forth in claim 10 including:
the cooling of the riced first group and second group of potatoes lowers the temperature to less than about 100° F.

13. A method as set forth in claim 12 including:
the cooling of the riced first group and second group of potatoes lowers the temperature to less than about 85° F.

14. A method as set forth in claim 12 wherein:
the thus combined and mixed first group and second group of potatoes are dehydrated to a moisture content of less than about 6% by weight.

15. A method as set forth in claim 13 wherein:
the thus combined and mixed first group and second group of potatoes are dehydrated to a moisture content of less than about 6% by weight.

16. A method as set forth in claim 1, 2, 4 or 3 wherein:
the cooling of the riced first group and second group of potatoes lowers the temperature to less than about 100° F.

17. A method as set forth in claim 16 wherein:
the cooling of the riced first group and second group of potatoes lowers the temperature to less than about 85° F.

* * * * *